US 8,265,610 B1

(12) United States Patent
Delker et al.

(10) Patent No.: US 8,265,610 B1
(45) Date of Patent: Sep. 11, 2012

(54) SPONSORED KEYWORD USAGE IN VOICE COMMUNICATION

(75) Inventors: Jason R. Delker, Olathe, KS (US); Robin D. Katzer, Olathe, KS (US); M. Jeffrey Stone, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 228 days.

(21) Appl. No.: 12/715,197

(22) Filed: Mar. 1, 2010

(51) Int. Cl.
*H04M 3/42* (2006.01)
(52) U.S. Cl. .................... 455/414.1; 455/414.4
(58) Field of Classification Search ............... 455/414.1, 455/404.2, 414.4
See application file for complete search history.

(56) References Cited

U.S. PATENT DOCUMENTS

| | | | |
|---|---|---|---|
| 5,003,584 A | | 3/1991 | Benyacar et al. |
| 5,732,216 A | | 3/1998 | Logan et al. |
| 6,947,531 B1 | | 9/2005 | Lewis et al. |
| 2001/0048737 A1 | | 12/2001 | Goldberg et al. |
| 2004/0107139 A1 | * | 6/2004 | Shibanuma ............... 705/14 |
| 2004/0110486 A1 | | 6/2004 | Sobel |
| 2004/0203613 A1 | * | 10/2004 | Zhu et al. ............... 455/412.1 |
| 2005/0177506 A1 | | 8/2005 | Rissanen |
| 2005/0283475 A1 | | 12/2005 | Beranek et al. |
| 2007/0027852 A1 | * | 2/2007 | Howard et al. ............... 707/3 |
| 2007/0060099 A1 | | 3/2007 | Ramer et al. |
| 2007/0105529 A1 | | 5/2007 | Lundstrom et al. |
| 2007/0116227 A1 | | 5/2007 | Vitenson et al. |
| 2008/0103971 A1 | | 5/2008 | Lukose et al. |
| 2008/0170676 A1 | * | 7/2008 | Douma et al. ............. 379/114.13 |
| 2010/0191608 A1 | | 7/2010 | Mikkelsen et al. |
| 2010/0279667 A1 | * | 11/2010 | Wehrs et al. ............... 455/414.1 |

OTHER PUBLICATIONS

Office Action dated Feb. 23, 2011, U.S. Appl. No. 12/417,081, filed Apr. 2, 2009.
Final Office Action dated Jun. 21, 2011, U.S. Appl. No. 12/417,081, filed Apr. 2, 2009.
Office Action dated Jun. 21, 2011, U.S. Appl. No. 12/470,352, filed May 21, 2009.
Delker, Jason R., et al., Patent Application entitled "Ad Sponsored Communication Pack," filed Feb. 18, 2011, U.S. Appl. No. 13/031,123.
Delker, Jason R., et al., Patent Application entitled "Content Provider Sponsored Services System and Methods," filed Apr. 2, 2009, U.S. Appl. No. 12/417,081.
Breau, Jeremy R., et al., Patent Application entitled "Post-Dial Pre-Connect Advertising and Call Sponsorship," filed May 21, 2009, U.S. Appl. No. 12/470,352.
Advisory Action dated Aug. 26, 2011, U.S. Appl. No. 12/417,081, filed Apr. 2, 2009.
Office Action dated Nov. 10, 2011, U.S. Appl. No. 12/417,081, filed Apr. 2, 2009.
Final Office Action dated Nov. 29, 2011, U.S. Appl. No. 12/470,352, filed May 21, 2009.
Burcham, Robert H., Application entitled "Multi-Call Ringback Reward Method," filed Nov. 22, 2006, U.S. Appl. No. 11/603,615.

(Continued)

*Primary Examiner* — Jinsong HU
*Assistant Examiner* — Michael Nguyen

(57) ABSTRACT

A server computer is provided comprising a processor, a memory, and an application stored in the memory that, when executed by the processor, identifies at least one keyword based on one of a first communication device and a second communication device and transmits the at least one keyword to the first communication device. The server computer also analyzes a voice traffic between the first communication device and the second communication device to determine whether the at least one keyword occurs in the voice traffic. When the at least one keyword is determined to occur in the voice traffic, the server computer sends a confirmation message to the first communication device.

9 Claims, 4 Drawing Sheets

OTHER PUBLICATIONS

Advisory Action dated Feb. 6, 2012, U.S. Appl. No. 12/470,352, filed May 21, 2009.

Final Office Action dated Apr. 13, 2012, U.S. Appl. No. 12/417,081, filed Apr. 2, 2009.

* cited by examiner

SPONSORED KEYWORD USAGE IN VOICE COMMUNICATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Vendors of consumer goods and services develop brand names, slogans, catchphrases, and jingles to establish identity of a brand and prompt an expanding public consciousness of the brand. Keywords may be developed and associated with brand names and images through placement of the keywords in advertising in a plurality of media types including televised video advertising, musical and other audible advertising on radio, and Internet advertising. Keywords may develop virally through communication among current and prospective users of a product or service with little action by the vendor. When a keyword, variations of the keyword, or series of related keywords are sonorous or otherwise aesthetically pleasing, the keywords may resonate among a community of attractive current and prospective customers. Successful keywords help create interest and prompt discussion among current and prospective users and may cause prospective users that otherwise may not be inclined to try a product. Successful keywords also may allow a vendor to bolster the identity and presence of a product in the consuming public's mind and potentially cause an affection for and eventual loyalty to the product to grow. This may establish a profitable long-term identity for the product and distinguish it from competitors.

SUMMARY

In an embodiment, a server computer is provided. The server computer comprises a processor, a memory, and an application stored in the memory that, when executed by the processor identifies at least one keyword based on one of a first communication device and a second communication device and transmits the at least one keyword to the first communication device. The server computer also analyzes a voice traffic between the first communication device and the second communication device to determine whether the at least one keyword occurs in the voice traffic. When the at least one keyword is determined to occur in the voice traffic, the server computer sends a confirmation message to the first communication device.

In an embodiment, a server computer is provided. The server computer comprises a processor, a memory, and an application stored in the memory that, when executed by the processor, transmits a first keyword to a communication device engaged in a voice call. The server computer also analyzes the content of a voice traffic of the voice call to determine whether the first keyword occurs in the voice traffic. When a trigger event occurs, the server computer also transmits a second keyword to the communication device. The server computer also analyzes the content of the voice traffic to determine whether the second keyword occurs in the voice traffic.

In an embodiment, a mobile communication device is provided. The mobile communication device comprises a processor, a radio transceiver, a memory, and an application stored in the memory that, when executed by the processor receives a keyword via the radio transceiver. The mobile communication device also presents the keyword. After presenting the keyword, the mobile communication device also monitors a voice call in which the mobile communication device is engaged. The mobile communication device also transmits a message confirming occurrence of the keyword in the voice call via the radio transceiver.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
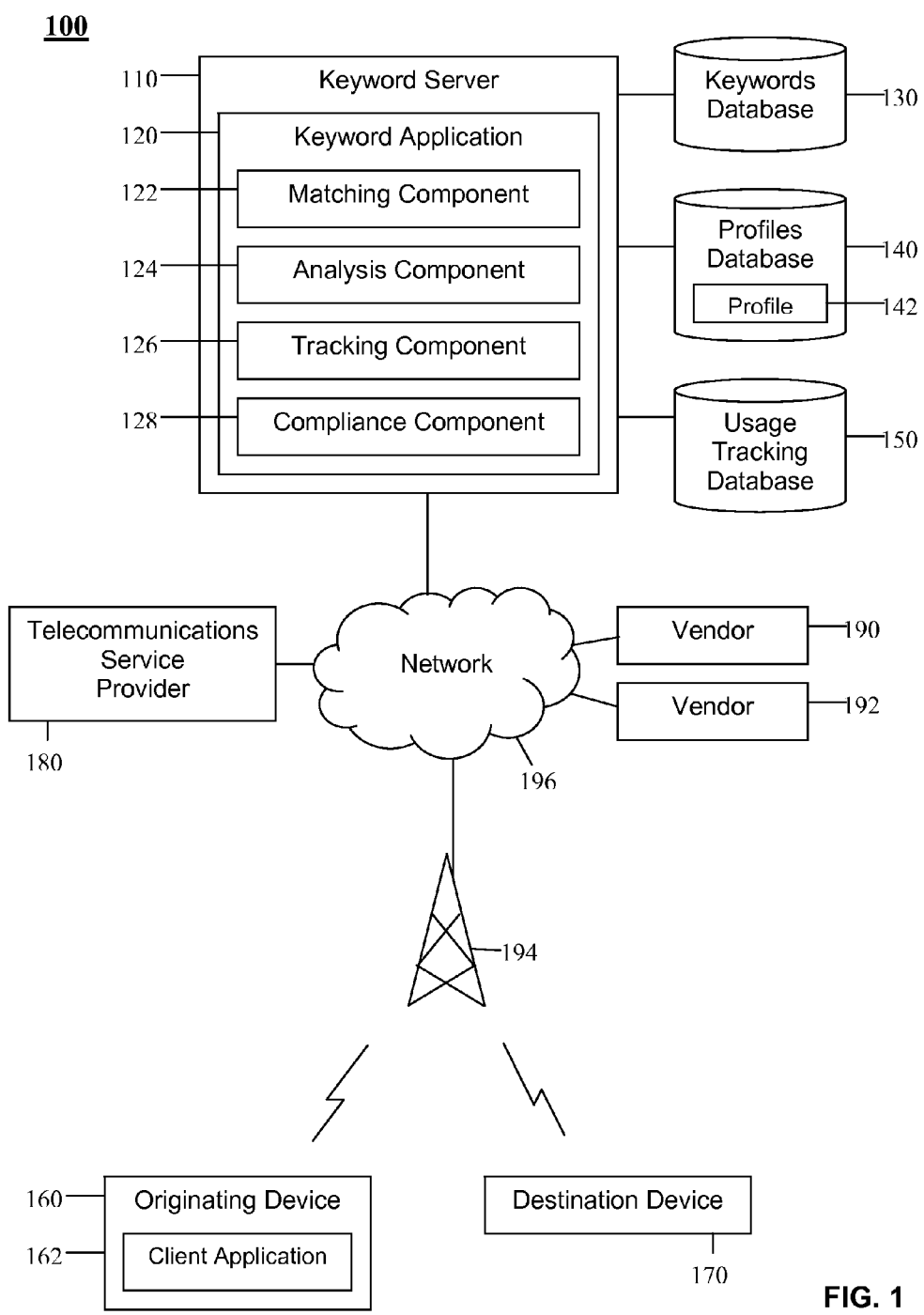
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches a server receiving information about the telephone calling activity of a communications device, the server selecting stored keywords associated with products appropriate for the user of the communications device, and the server audibly or visually providing the keyword to the communications device during a telephone conversation. The server monitors the telephone conversation for the speaking of the provided keyword by the user and provides a benefit to the user when the keyword is spoken by the user during the call under predetermined conditions.

A vendor of consumer products, for example, may wish to incentivize a plurality of users of communications devices to generate publicity and discussion about the vendor's products by instituting a sponsored keyword program. The vendor may want to encourage its customers, prospective customers, and others to mention and potentially prompt discussion about and promotion of its products during some telephone conversations. A telecommunications service provider serving a large quantity of wireless and other subscribers may cooperate with the vendor to enlist subscribers to participate in such a sponsored keyword program. Participating subscribers may authorize the insertion of some keywords sponsored by the vendor associated with the vendor's products. Participating subscribers may also authorize some of the subscriber's calls to be monitored and possibly recorded to detect the speaking of the provided keywords during some conversations. Participating subscribers may receive benefits for speaking provided keywords under prescribed conditions.

The server, that may be administered by the telecommunications service provider, may execute an application that accesses a database containing a plurality of keywords sponsored by the vendor or a plurality of vendors. The application may select one or more keywords to insert into the subscriber's telephone conversation based on information contained in a stored profile for the subscriber, based on the time and day of the conversation, and possibly based on information about the other party or parties to the conversation. The keywords may be product names or other words indicating products. The keywords may be transmitted to the subscriber in a manner audible or visible only to the subscriber using an originating communication device and not provided to other parties to the conversation. When the keyword is spoken by the subscriber during the call, the application may, at the direction of the vendor, provide an electronic coupon to the subscriber, credit an account with points that later may be redeemed for items of value by the subscriber, pay some or all of the costs of the call, or provide another benefit. Keywords chosen may be specific to a subscriber depending on demographic and socioeconomic information gathered about the subscriber and data accumulated about the subscriber's calling history, consumer product preferences, and product usage history.

The vendor, in its relationship with the telecommunications service provider, may define rules according to which keywords are chosen and provided to the subscriber. The vendor also may set rules applying to how benefits are determined and awarded to the subscriber speaking provided keywords. The application applies controls to enforce the rules and prevent subscribers from attempting to game the vendor's sponsored keyword program or otherwise circumvent the spirit of the program enabled by the systems taught by the present disclosure.

The present disclosure also teaches using profile information about the other party or parties to a call involving the subscriber. When this information is available, the information could be used to change a provided keyword or provide a different benefit if the keyword is spoken. Even without profile information, telephone numbers called could be tracked and benefits provided could possibly be diminished or eliminated for multiple calls to the same telephone number within a given time period or if the same keyword or keywords from the same vendor are spoken an excessive quantity of times within a given time period.

Turning now to FIG. 1, a system 100 of sponsored keyword usage in voice communication is provided. The system 100 comprises a keyword server 110, a keyword application 120, a keywords database 130, a profiles database 140, a usage tracking database 150, an originating device 160, a destination device 170, a telecommunications service provider 180, vendors 190, 192, a base transceiver system 194, and a network 196. While the keywords database 130, the profiles database 140, and the usage tracking database 150 are depicted in FIG. 1 as separate databases, in an embodiment two or more of the keywords database 130, the profiles database 140, and the usage tracking database 150 may be combined. In some contexts, the originating device 160 and/or the destination device 170 may be referred to as communication devices. In an embodiment, one or both of the originating device 160 and the destination device 170 may be a mobile communication device.

The keyword server 110 may be implemented by a computer system. Computer systems are discussed in greater detail hereinafter. The keyword application 120 executes on the keyword server 110 and observes or is notified of the initiation of a voice telephone call between the originating device 160 and the destination device 170. The keyword application 120 analyzes information about the originating device 160, its user, and the day and time of the telephone call. The keyword application 120 also may likewise analyze information about the destination device 170 and its user. The keyword application 120 determines at least one keyword associated with a consumer product or service that may be appropriate for discussion during the telephone conversation based on the information analyzed. Keywords are sponsored by vendors 190, 192 of consumer and other goods and services and may be stored in the keywords database 130 associated with the keyword server 110. Keywords also may be sponsored by non-profit organizations, governmental organizations, political candidates, and other non-commercial entities. The keyword application 120 conveys the determined keyword to the originating device 160 in a manner that may be audible only to the user of the originating device 160. The keyword application 120 may convey the determined keyword to the originating device 160 before the outgoing call placed by the originating device 160 is connected, when the call is connected, or during the conversation. If the keyword is spoken by the user of the originating device 160 during the conversation, the keyword application 120 may immediately or at a later time provide an item of value to the originating device 160.

Keywords may be provided in a one way or single insertion into a phone conversation to the user of one of the originating device 160 and the destination device 170. Keywords may be provided in multiple ways to the user, for example audibly, in text format or as a Wireless Application Protocol (WAP) page on the viewing display of one of the originating device 160 and the destination device 170, where ancillary information additionally may be displayed that may replace caller identification information that otherwise would be displayed.

In an embodiment, both the originating device 160 and the destination device 170 may be enrolled in the sponsored keyword program and both devices may receive and be rewarded for the speaking of inserted keywords during the same telephone conversation. The keyword application 120 may be aware of this dual presence and may manage keywords in a complementary fashion or may provide keywords and benefits or rewards independently to each side.

The telecommunications service provider 180 may enter into commercial arrangements with vendors 190, 192 of consumer or other goods and services or their representatives. The vendors 190, 192 may arrange to offer benefits to customers of the telecommunications service provider 180 that during telephone calls speak predetermined keywords associated with products sold by the vendor 190. The telecommunications service provider 180 may operate the keyword server 110 and keyword application 120 to provide certain keywords to the originating device 160 at the beginning of or during a phone conversation with the destination device 170. The keyword provided to the originating device 160 may be selected by the keyword application 120 or by the vendors 190. The user of the originating device 160 may be a subscriber to wireless communication services or other services sold by the telecommunications service provider 180 and may enter into an arrangement wherein the user may agree that from time to time the telecommunications service provider 180 may provide a keyword that the user may choose to speak during a telephone conversation in return for an item of value, such as an electronic coupon.

The keyword application 120 may create a profile 142 for the originating device 160 and its user. The profile 142 may contain demographic and socioeconomic information about the user. The profile 142 also may contain information about the user's calling habits during times of day, days of the week, and at various times of the year and to specific destination devices 170. The profile 142 also may contain information provided by the vendor 190 about the user's purchasing and usage patterns of the products sold by the vendor 190 and others that may be associated with the keywords. The user of the originating device 160 may authorize the telecommunications service provider 180 to record and analyze some of the telephone calls made by the originating device 160 to assist in developing the profile 142 and determining with the vendor 190 the keywords to use for calls placed by the originating device 160. The keyword application 120 may continually update the profile 142 based on observed usage of voice and data services by the originating device 160 and based on the observed and analyzed content of telephone calls made by the originating device 160. The telecommunications service provider 180 may update the profile 142 with information associated with online transactions completed by the originating device 160 and other online activities and interactions of the originating device 160. The keyword application 120 may allow the user of the originating device 160 limited access to the profile 142 to add or revise demographic, economic, and product preference information that may be of value to the keyword application 120 and the vendor 190 in developing and providing more accurately targeted keywords.

The keyword application 120 uses the profile 142 in conjunction with other information to determine one or more keywords to provide to the originating device 160 at the beginning of or during a telephone conversation with the destination device 170. The keyword application 120 may take recommendation or direction from the vendors 190, 192 about the keyword or keywords to provide and when to provide them. The keyword application 120 may provide a first keyword to the originating device 160 and later in the same telephone conversation provide a second keyword based on at least one of a plurality of conditions. The conditions may comprise the first keyword having been spoken, the first keyword not having been spoken, and/or the passage of a predetermined amount of time during the call. The keyword application 120 may choose from a plurality of second keywords to provide the originating device 160 depending on the conditions described as well as the previously described variables bearing upon the choice of the first keyword.

The keyword application 120 may monitor or record some telephone calls placed by the originating device 160 to at least one of a plurality of destination devices 170. In some instances, the identity of the user of the destination device 170 and information about the destination device itself may be of relevance to the keyword application 120 and in other instances this information may be disregarded. The keyword application 120 may use speech recognition or other software that analyzes and interprets audible content to determine whether a provided keyword(s) was spoken by the user of the originating device 160. When using these methods, the keyword application 120 may instantaneously determine whether the provided keyword(s) was spoken under the prescribed conditions. The keyword application 120 may alternatively convert the recorded calls to text media and scan the text media to determine if the first and/or subsequent keywords appear in the text, demonstrating that the provided keyword(s) was spoken. The keyword application 120 may apply additional scanning and testing to determine that the provided keyword(s) was spoken by the user of the originating device 160 as opposed to having been spoken by another party to the telephone conversation. The keyword application 120 may alternatively provide the reward or benefit if the keyword was spoken during the telephone conversation regardless of which party spoke the keyword. The keyword application 120 may even provide the reward or increase the value of the reward if the user of the originating device 160 or other subscriber is able to induce another participant in the telephone call to speak the keyword.

The keyword application 120 may maintain records of provided keyword(s) being spoken by the originating device 160 under predetermined required conditions. The keyword application 120, working in cooperation with the vendors 190, 192, may provide items of value to the originating device 160 in return for speaking the provided keyword(s). In an embodiment, the originating device 160 may be provided multiple items of value when the keyword application 120 detects that the provided keyword was spoken multiple times during the normal course of a telephone conversation. The items of value may comprise electronic coupons redeemable during the purchase of goods or services sold by the vendors 190, 192 or other parties. The items of value may comprise points toward loyalty programs offered by airlines or other providers. Accrued points may be redeemed by the user of the originating device 160 for free air travel or other items of value. Items of value may also comprise a call in which a provided keyword is spoken being provided partially or fully free of charge or additional minutes of phone usage added to the user's subscription account. The user may be incentivized to use keywords wherein the user is required to speak a provided keyword within a certain period of time or the call may terminate automatically after a warning. A message may be provided that is audible only to the user of the originating device 160 warning the user to speak a keyword or lose connection to the destination device 170. The user may be required to use one or more keywords per each block of time during a call, for example each successive two minute period, or the call may cease to be free of charge to the user or the call may terminate. If the user speaks a quantity of keywords greater than is required, the user may be awarded with extra call minutes or other items of value.

The keyword application 120 may provide items of value to the originating device 160 immediately upon detecting the speaking of a provided keyword(s) when speech recognition software is used or at a subsequent time if analyzing text media derived from recorded telephone calls. The keyword application 120 or vendors 190, 192 may send an electronic coupon or other item of value directly to the originating device 160 or to an electronic mail address associated with the user of the originating device 160. The user of the originating device 160 may subsequently tender the electronic coupon at a point of sale terminal at a physical retail establishment associated with the vendors 190, 192 or may subsequently tender the electronic coupon during an online transaction by entering instructions on the originating device 160. The electronic coupon may have an expiration date and may not fully activate until the originating device 160 is physically carried into a retail establishment associated with the vendors 190, 192 and monitoring devices located on the premises of the establishment detect the entry of the originating device 160.

The keyword application 120 may enforce conditions mandated by the vendors 190, 192 to ensure that the user of the originating device 160 participating in a sponsored keyword program does not intentionally abuse the program. The keyword application 120 may apply rules and controls to ensure that a provided keyword(s) is spoken by the user in a natural manner in the normal context of the user's telephone conversation with the user of the destination device 170. Since the originating device 160 receives items of value from the vendors 190, 192 for the user speaking provided keyword(s), the user may be tempted to "game" the system by speaking provided keyword(s) in rapid succession in an unnatural manner or inducing the user of the destination device 170 to participate in an abnormal manner when acknowledgement or involvement by that component may be required or beneficial. Credit for speaking a provided keyword may be provided once per usage in a telephone call or other similar approaches may be used to devalue rapid repeating of the provided keyword. Alternatively, the view of some vendors 190, 192 may be that any amount or type of publicity is beneficial. Such vendors may be less concerned if the use of a provided keyword is peculiar or unusual.

The present disclosure teaches the keyword application 120 executing on the keyword server 110 and the actions of the keyword application 120 taking place primarily on the keyword server 110. In an alternative embodiment, software components, for example the client application 162, executing on the originating device 160 may request and receive the provided keyword(s) from the keyword application 120. The client application 162 presents the provided keyword(s) in an audible or visible manner on the originating device 160. The client application 162 may monitor a voice call made by the originating device 160. Monitoring the voice call may be referred to in some contexts as monitoring a voice traffic of a voice call. Monitoring the voice call may involve monitoring voice traffic created by the originating device 160 only, monitoring voice traffic created by the destination device 170 only, or monitoring voice traffic created by both the originating device 160 and the destination device 170. Monitoring the voice traffic comprises analyzing the voice traffic to identify the occurrence of one or more provided keywords. The analysis of the voice traffic may be conducted using any of a variety of known methods of speech analysis and speech recognition. Upon detecting the occurrence or speaking of the provided keyword(s) by the user of the originating device 160, or in some embodiments by any party on the call, the client application 162 may then report this event to the keyword application 120.

The keyword application 120 comprises the matching component 122 that matches originating devices 160 with sponsored keywords provided by vendors 190, 192. The matching component 122 may access the keywords database 130 when the originating device 160 is observed to initiate a telephone call to the destination device 170 under certain predetermined conditions of the sponsored keyword program of the vendor 190. In an embodiment, one or more keywords may be transmitted to the originating device 160 in advance of any calls made and the keyword application 120 could track usage of those cached keywords in calls made later in the day, week, or other time period. The originating device 160, the destination device 170, and other parties to the telephone call may be identified by at least one of a telephone number, a mobile equipment identifier (MEID), and an electronic serial number (ESN). The matching component 122 may provide the functionality to detect that the originating device 160 has originated an outgoing telephone call or another component that may not be part of the system 100 may provide this functionality. The keywords database 130 may contain keywords sponsored by the vendors 190, 192 that may be provided to the originating device 160 under the predetermined conditions. When the keyword application 120 detects or is provided notification that the originating device 160 has originated a voice telephone call, the matching component 122 may examine information about the call to determine if a keyword should be provided to the originating device 160. The matching component 122 may extract the profile 142 associated with the originating device 160 and its user from the profiles database 140. The profile 142 may have been created by the telecommunications service provider 180 as part of its overall relationship with the subscriber and the subscriber's use of the originating device 160 of which the sponsored keyword program is a component part. The profile 142 may have been created by the vendor 190 or may have been created by another party. The matching component 122 may combine the information in the profile 142 with information about the telephone call that may comprise identifying information about the destination device 170 and its user, and the day of the week, time of day, and time of year of the call. Additional information may be analyzed such as whether the call is coincident with the occurrence of a major public event such as a championship sporting event, a breaking news event, or a developing weather condition, for example. These nonrecurring events may play a role in the matching component 122 determining what keyword, if any, to insert into the telephone call placed by the originating device 160.

The vendor 190 may vary keywords to insert into telephone conversations depending on seasonal considerations and the type of businesses in which the vendor 190 engages. A food and consumer goods conglomerate might insert keywords into telephone conversations during the month of October to incentivize the user of the originating device 160 to mention Halloween candy and take the same action during the month of November to incentivize the user to mention turkey and associated Thanksgiving food items. The vendor 190 and the telecommunications service provider 180 may design and implement the sponsored keyword program with a level of sophistication and complexity such that the context in which keywords are spoken may be determined and analyzed. When the provided keyword is spoken in a sentence that is a question, for example, the keyword application 120 may provide an item of greater value or award more points than if the keyword is not spoken in an interrogative sentence.

The matching component 122 may enter information extracted from the profile 142 and the information specific to the call made by the originating device 160 into various algorithms or quantitative models that are components of or otherwise available to the keyword application 120. Based on the results of these actions, the matching component 122 may determine if one or more keywords should be inserted into the telephone call and when they should be inserted. The matching component 122 may determine the at least one keyword or may consult functionality provided by the vendor 190 to determine the keyword. The matching component 122 extracts the at least one keyword from the keywords database 130 and audibly inserts the keyword into the conversation wherein the keyword may only be audible to the user of the originating device 160. The matching component 122 may alternatively or in addition visibly present the keyword in the display of the originating device 160 and provide an audible tone on the originating device 160 to alert the user that a keyword is displayed and may be read and spoken in the conversation by the user. In an embodiment, the matching component may provide the keyword to the user of the originating device 160 in an electronic mail message and/or in a short message service (SMS) message, also known as a text message.

The matching component 122 may transmit the keyword to the user of the originating device 160 for speaking at the beginning of the conversation or at a later point during the conversation depending on directions provided by the vendor 190 for use of that particular keyword. A second keyword may subsequently be inserted into the conversation depending on a plurality of conditions, for example length of call. Items of value later provided to the originating device 160 may depend on the second keyword having been spoken, the first keyword having been spoken, the amount of time passed between the speaking of the first and second keywords, the quantity of times the at least one keyword was spoken, and words spoken by the user of the destination device 170 when applicable. When the matching component 122 determines or receives notification that the originating device 160 has placed an outgoing telephone call, the matching component 122 retrieves and consults the profile 142 for the originating device 160 and combines the profile information with other information about the call and possibly coincident events. The matching component 122 may then retrieve or be provided by the vendor 190 a keyword or keywords from the keywords database 130. The matching component 122 also may receive instructions for how and when to insert the keyword or keywords, and the instructions may cover contingencies regarding when, for example, to insert the second keyword, if the first keyword is or is not spoken by the user of the originating device 160.

The keyword application 120 may also comprise the analysis component 124 that analyzes the telephone conversation between the originating device 160 and the destination device 170 to determine if the provided keyword was spoken by the user of the originating device 160. The analysis component 124 may use speech recognition software to determine on a near real-time basis if the keyword was spoken. The analysis component 124 may alternatively or in conjunction with the use of voice recognition software record the telephone conversation and convert the conversation to text media. The analysis component 124 may then scan the text transcript of the conversation to determine if the provided keyword appears in the transcript.

The analysis component 124 may determine if the provided keyword was spoken and whether the keyword was spoken by the user of the originating device 160, the user of the destination device 170, both parties, or by another party to the conversation. The analysis component 124 may examine the instructions provided to the matching component 122 to determine if the provided keyword was spoken at a time or during a time period required by the vendor 190 under the prescribed conditions of the sponsored keyword program for that keyword. When the analysis component 124 determines that the provided keyword was spoken within the prescribed conditions for that keyword as conveyed to the originating device 160, the analysis component 124 may then send a confirmation message to the originating device 160. The confirmation message may contain the item of value, such as an electronic coupon, for use by the user of the originating device 160. The confirmation message may alternatively advise the quantity of credits or points to be added to the account of the originating device 160 if such a reward arrangement is used.

When the instructions provided to the matching component 122 provide for the insertion of a second keyword into the telephone conversation under all or some circumstances after the provision of the first keyword, the analysis component 124 determines if the second keyword was spoken at a time or during a time period prescribed by the vendor 190 under the prescribed conditions of the sponsored keyword program. When the quantity of times that the first keyword and/or the second keyword were spoken during the telephone conversation is relevant to the vendor 190, the analysis component 124 observes this quantity.

The keyword application 120 also comprises the tracking component 126 that receives results from the analysis component 124 and performs record keeping activities in connection with the sponsored keyword program. When items of value provided to the originating device 160 are credits or points that accrue to the account of the originating device 160 and later may be redeemed for rewards, the tracking component 126 may maintain the account in the usage tracking database 150.

The tracking component 126 also may maintain a plurality of records about the use of keywords by the user of the originating device 160 over an extended period of time. The tracking component 126 may store records of each call tracked, provide a tracking number for each call, and record the usage of provided keywords during each tracked call. When examining the usage of the sponsored keyword program by the user of the originating device 160, the tracking component 126 may be useful to the vendors 190, 192 in determining new ways to incentivize the user to more frequently speak provided keywords during telephone conversations. Analysis of usage patterns by the user may suggest different keywords to provide or different schemes for providing a combination of keywords. Because the sponsored keyword program may be used with a large plurality of originating devices 160, records stored by the tracking component 126 may be useful to the vendor 190 and the telecommunications service provider 180 in analyzing the success of the sponsored keyword program, making adjustments to the program, and developing new features of the program. When a significant body of results of the program involving a population of originating devices 160 has been gathered, statistical techniques may be applied to the results, and management action may be taken to adjust aspects of the program.

In an example illustrating the interactions of the components of the system 100, the matching component 122 may transmit to the originating device 160 a first keyword and a second keyword at the beginning of or during a telephone call placed by the originating device 160 to the destination device 170. The matching component 122 may provide the two keywords together or in a plurality of combinations. The matching component 122 may prescribe that the two keywords are spoken in a predetermined order or may not prescribe an order. In the example provided herein, the keyword application 120 does not require a combination or order of speaking of the two keywords. The keyword application 120 rather provides separate items of different value for the speaking of each of the two keywords during the telephone call. The keyword application 120 additionally provides a third item of value for the speaking of both keywords during the telephone call in any combination or order. The keyword application 120 may stipulate prescribed conditions regarding the speaking of both keywords during the telephone call such as prescribing that the two keywords must be spoken within a certain period of time, for example thirty seconds.

In this example, when both the first keyword and the second keyword are spoken by the user of the originating device 160 during the telephone call regardless of the order, the keyword application 120 sends a first confirmation message to the originating device 160. The first confirmation message may contain an item of value or other benefit, such as an electronic coupon and may provide confirmation to the originating device 160 that the first keyword and the second keyword were spoken during the same telephone call. The keyword application 120 may also store an entry of a first type in the usage tracking database 150. The entry of the first type indicates that both the first keyword and the second keyword were spoken and may credit an account or increment the account total with redeemable points.

Even if the user of the originating device 160 is not provided with an electronic coupon or other benefit, it may be helpful to confirm for the user of the originating device 160 that his or her effort to speak the first keyword was successfully recognized. This may both encourage the user to look for the second keyword, that may be provided with the confirmation, and also avoid the necessity that may be perceived by the user to keep repeating the first keyword to make sure that it is ultimately recognized by the keyword application.

When the first keyword is not spoken but the second keyword is spoken in the example, the keyword application 120 sends a second confirmation message to the originating device 160 and may store an entry of a second type in the usage tracking database 150. The second confirmation message may provide an item of different value than the first confirmation message and may provide confirmation to the originating device 160 that the second keyword was spoken during the telephone call. The keyword application 120 also may store an entry of a second type in the usage tracking database 150. The entry of the second type indicates that the second keyword but not the first keyword was spoken and may credit an account or increment the account total with redeemable points. The entry of the second type may credit the account of the originating device 160 with a quantity of points or other measure of value that is different than that credited by the entry of the first type.

Continuing with the example, when neither the first keyword nor the second keyword is spoken during the telephone call, the keyword application 120 does not send a confirmation message to the originating device 160. The keyword application 120 does, however, record an entry of a third type in the usage tracking database 150. The entry of the third type notes that neither the first nor second keywords were used during the telephone call. The existence of a plurality of entries of the third type in the usage tracking database 150 associated with the originating device 160 may indicate that keywords selected for insertion into telephone calls originated by the originating device 160 may not be correctly targeted for the user of the originating device 160. This may prompt an analysis by the telecommunications service provider 180 and the vendor 190 that may result in the profile 142 associated with the originating device 160 and its user being changed and different keywords being selected for targeting to the originating device 160.

The analysis by the analysis by the telecommunications service provider 180 and the vendor 190 also may be used to identify problems with voice recognition and suggest recalibration. The analysis also may be used to identify problems with delivery of keywords or problems with the user of the originating device 160 understanding the keyword or understanding the overall process for speaking inserted keywords. Repeated events indicating these types of difficulties could generate warnings or automatic attempts to troubleshoot problems, provide training, and ultimately resolve the problem(s).

The keyword application 120 also comprises the compliance component 128 that ensures that the conditions prescribed by the sponsored keyword program are enforced and observed within the spirit of the program. Because the keyword application 120 provides items of benefit for the speaking of certain keywords during telephone conversations, a user of the originating device 160 may be tempted to circumvent the conditions of the program. The user may speak keywords in rapid succession during a telephone conversation. The user may record keywords in the user's own voice into a recording device and rapidly play the recorded keywords into the originating device 160 during a telephone conversation. The compliance component 128 uses speech recognition and analysis technology to examine telephone conversations and assure that provided keywords spoken by the user of the originating device 160 are spoken in a natural manner in the normal context of conversation with the user of the destination device 170.

The originating device 160 may be one of a mobile telephone, a personal digital assistant (PDA), or a media player. In an embodiment, the client application 162 executing on the originating device 160 may perform some of the functions of the keyword application 120. At the beginning of or during a telephone conversation placed by the originating device 160, the client application 162 may receive the provided keyword from the matching component 122 of the keyword application 120. The client application 162 presents the keyword on the originating device 160 in audible and/or viewable form as previously discussed. The client application 162 monitors the telephone call for the speaking of the keyword and upon observing the speaking of the keyword, the client application 162 transmits a message confirming this event back to the keyword application 120 executing on the keyword server.

The base transceiver station 194 may promote wireless communication based on standard wireless communication protocols, for example the Code Division Multiple Access (CDMA) protocol, the Global System for Mobile Communications (GSM) protocol, the Universal Mobile Communications System (UMTS) protocol, and/or the Long-term Evolution (LTE) cellular wireless protocol. The base transceiver station 194 may be at least one of a World-wide Interoperable Microwave Access (WiMAX) base station, a WiFi access point, a femtocell, and other wireless access device. While FIG. 1 depicts only one base transceiver station 194, in an embodiment a plurality of base transceiver stations 194 may be existent and in operation.

The network 196 promotes communication between the components of the system 100. The network 196 may be any communication network including a public data network (PDN), a public switched telephone network (PSTN), a private network, and/or a combination.

In an embodiment, instead of the originating device 160 receiving an item of value previously described herein for its user speaking a provided keyword, the originating device 160 may receive benefits provided to its subscription account with the telecommunications service provider 180. Such benefits may comprise additional minutes added to the subscription account, for example. In an embodiment, the sponsored keyword program may be administered to the originating device 160 in a punitive manner wherein the user of the originating device 160 is required to speak a provided keyword and may lose minutes or other benefits of the user's subscription relationship if the user does not speak a provided keyword during a telephone conversation.

While in some descriptions above the keyword sponsoring and keyword usage monitoring may have been described especially with reference to the originating device 160, it is understood that in different embodiments the keyword sponsorship and keyword usage monitoring may be conducted based on one-way keyword insertion and keyword usage monitoring involving the originating device 160, based on one-way keyword insertion and keyword usage monitoring involving the destination device 170, and/or based on two-way keyword insertion and keyword usage monitoring involving both the originating device 160 and the destination device 170. Transmitting the sponsored keyword to only one of the originating device 160 and the destination device 170 may be referred to as one-way keyword insertion. Transmitting the sponsored keyword to both the originating device 160 and the destination device 170 may be referred to as two-way keyword insertion. In an embodiment, one-way keyword insertion may be combined with one-way keyword usage monitoring (e.g., monitoring only one of the voice traffic created by the originating device 160 or the voice traffic created by the destination device 170 for occurrence of the keyword). In another embodiment, one-way keyword insertion may be combined with two-way keyword usage monitoring (e.g., monitoring both the voice traffic created by the originating device 160 and the voice traffic created by the destination device 170 for occurrence of the keyword). In another embodiment, two-way keyword insertion may be combined with one-way keyword usage monitoring. In another embodiment, two-way keyword insertion may be combined with two-way keyword usage monitoring.

Figure 2:
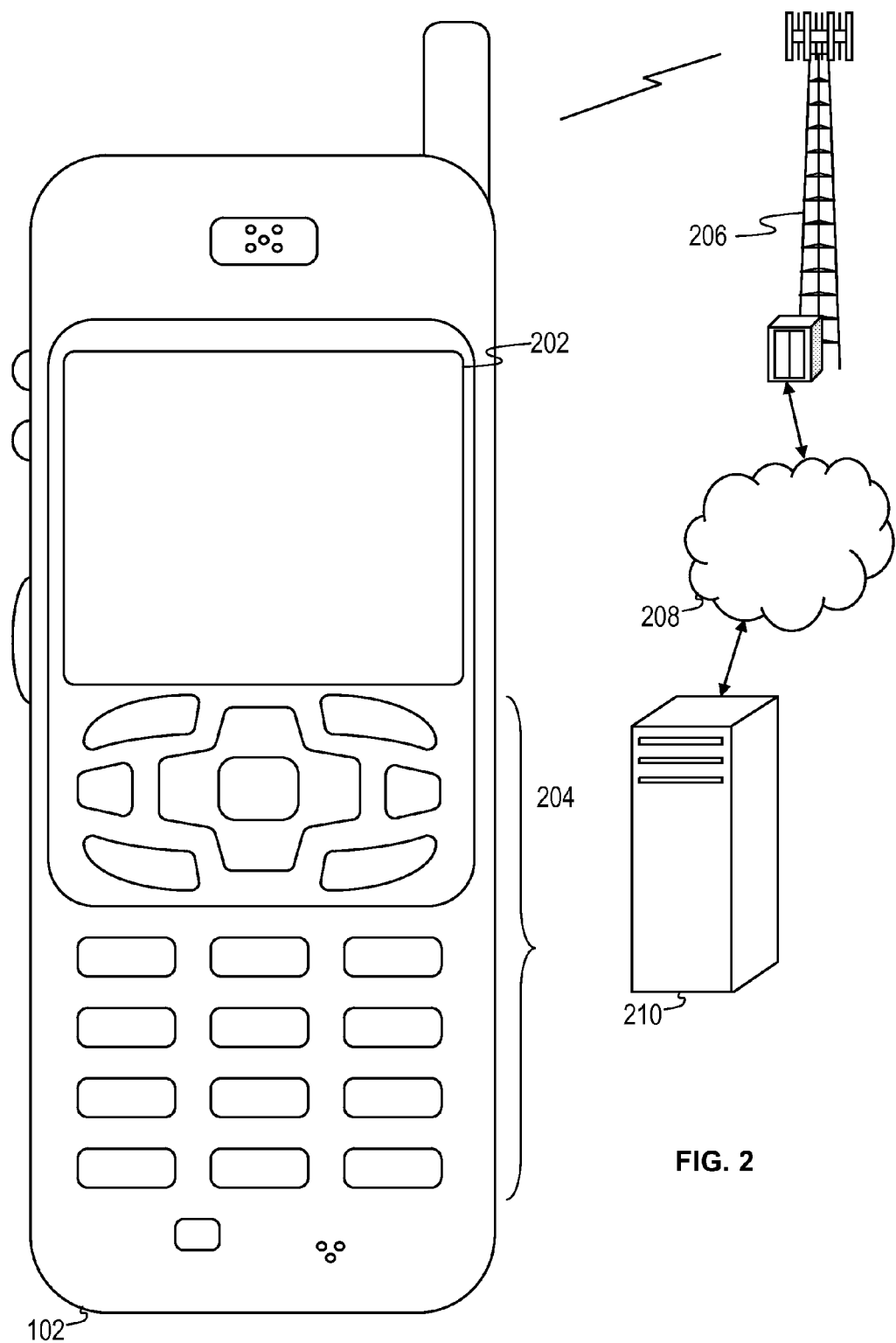
FIG. 2 is an illustration of a mobile device according to an embodiment of the disclosure.

FIG. 2 shows a wireless communications system including a mobile device 102. FIG. 2 depicts the mobile device 102, which is operable for implementing aspects of the present disclosure, but the present disclosure should not be limited to these implementations. The mobile device 102 may in some embodiments exemplify the originating device 160 described in the system 100. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 202 and a touch-sensitive surface and/or keys 204 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 202 to show a web page. The web page may be obtained via wireless communications with a base transceiver station (BTS) 206, a wireless network access node, a peer mobile device 102 or any other wireless communication network or system. While a single base transceiver station 206 is illustrated, it is understood that the wireless communication system may comprise additional base transceiver stations. In some instances, the mobile device 102 may be in communication with multiple base transceiver stations 206 at the same time. The base transceiver station 206 (or wireless network access node) is coupled to a wired network 208, such as the Internet. Via the wireless link and the wired network, the mobile device 102 has access to information on various servers, such as a server 210. The server 210 may provide content that may be shown on the display 202. Alternately, the mobile device 102 may access the base transceiver station 206 through a peer mobile device 102 acting as an intermediary, in a relay type or hop type of connection.

Figure 3:
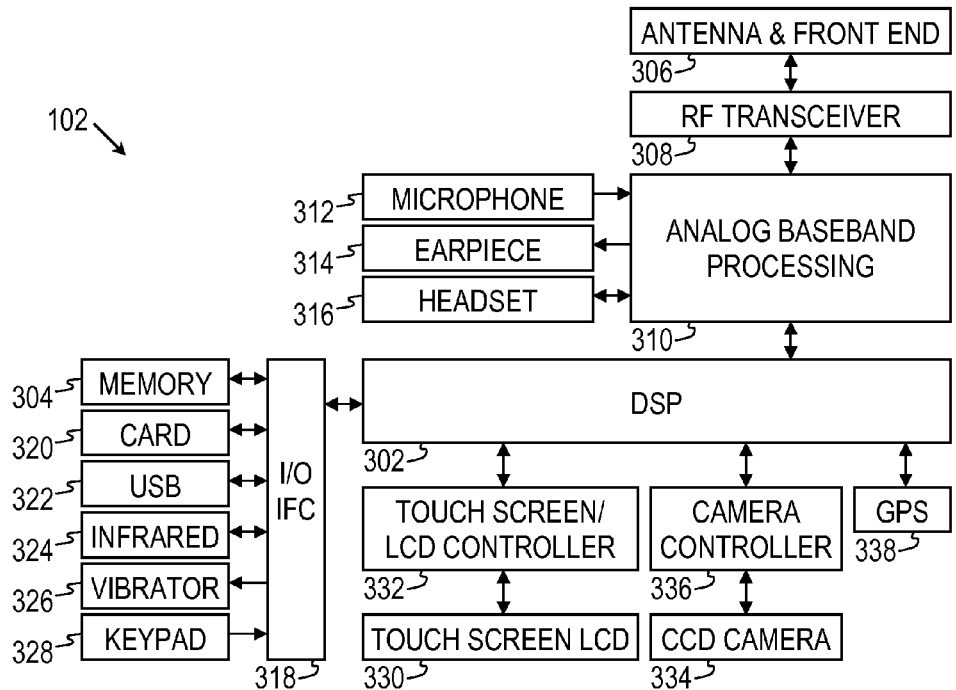
FIG. 3 is a block diagram of a mobile device according to an embodiment of the disclosure.

FIG. 3 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 302 and a memory 304. As shown, the mobile device 102 may further include an antenna and front end unit 306, a radio frequency (RF) transceiver 308, an analog baseband processing unit 310, a microphone 312, an earpiece speaker 314, a headset port 316, an input/output interface 318, a removable memory card 320, a universal serial bus (USB) port 322, an infrared port 324, a vibrator 326, a keypad 328, a touch screen liquid crystal display (LCD) with a touch sensitive surface 330, a touch screen/LCD controller 332, a charge-coupled device (CCD) camera 334, a camera controller 336, and a global positioning system (GPS) sensor 338. In an embodiment, the mobile device 102 may include another kind of display that does not provide a touch sensitive screen. In an embodiment, the DSP 302 may communicate directly with the memory 304 without passing through the input/output interface 318.

The DSP 302 or some other form of controller or central processing unit operates to control the various components of the mobile device 102 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front end unit 306 may be provided to convert between wireless signals and electrical signals, enabling the mobile device 102 to send and receive information from a radio access network (RAN) or some other available wireless communications network or from a peer mobile device 102. In an embodiment, the antenna and front end unit 306 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 306 may include antenna tuning and/or impedance matching components, RF power amplifiers, and/or low noise amplifiers.

The RF transceiver 308 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 310 and/or the DSP 302 or other central processing unit. In some embodiments, the RF transceiver 308, portions of the antenna and front end 306, and the analog baseband processing unit 310 may be combined in one or more processing units and/or application specific integrated circuits (ASICs).

The analog baseband processing unit 310 may provide various analog processing of inputs and outputs, for example analog processing of inputs from the microphone 312 and the headset port 316 and outputs to the earpiece speaker 314 and the headset port 316. To that end, the analog baseband processing unit 310 may have ports for connecting to the built-in microphone 312 and the earpiece speaker 314 that enable the mobile device 102 to be used as a mobile phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In some embodiments, at least some of the functionality of the analog baseband processing unit 310 may be provided by digital processing components, for example by the DSP 302 or by other central processing units.

The DSP 302 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation. In other wireless technology applications, yet other signal processing functions and combinations of signal processing functions may be performed by the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB port 322 and the infrared port 324. The USB port 322 may enable the mobile device 102 to function as a peripheral device to exchange information with a personal computer or other computer system. The infrared port 324 and other optional ports such as a Bluetooth interface or an IEEE 802.11 compliant wireless interface may enable the mobile device 102 to communicate wirelessly with other nearby handsets and/or wireless base stations.

The input/output interface 318 may further connect the DSP 302 to the vibrator 326 that, when triggered, causes the mobile device 102 to vibrate. The vibrator 326 may serve as a mechanism for silently alerting the user to any of various events such as an incoming call, a new text message, and an appointment reminder.

The keypad 328 couples to the DSP 302 via the interface 318 to provide one mechanism for the user to make selections, enter information, and otherwise provide input to the mobile device 102. Another input mechanism may be the touch screen LCD 330, which may also display text and/or graphics to the user. The touch screen LCD controller 332 couples the DSP 302 to the touch screen LCD 330.

The CCD camera 334 enables the mobile device 102 to take digital pictures. The DSP 302 communicates with the CCD camera 334 via the camera controller 336. The GPS sensor 338 is coupled to the DSP 302 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 4:
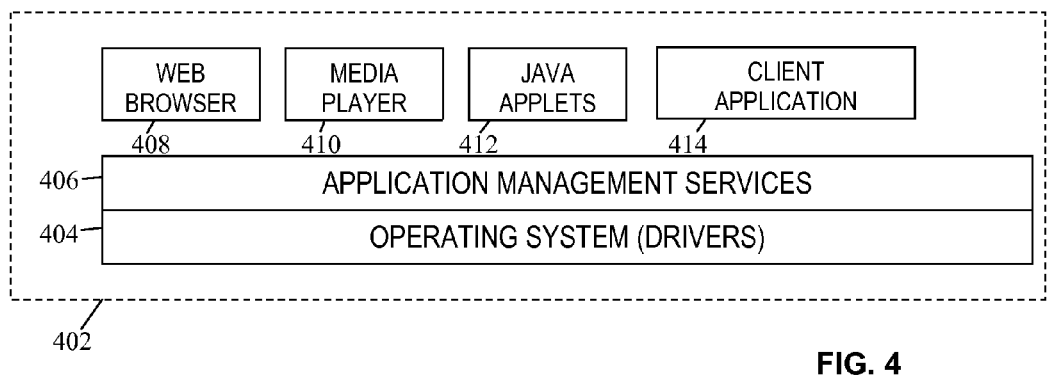
FIG. 4 is a block diagram of a software architecture for a mobile device according to an embodiment of the disclosure.

FIG. 4 illustrates a software environment 402 that may be implemented by the DSP 302. The DSP 302 executes operating system software 404 that provides a platform from which the rest of the software operates. The operating system software 404 may provide a variety of drivers for the handset hardware with standardized interfaces that are accessible to application software. The operating system software 404 may be coupled to and interact with application management services ("AMS") 406 that transfer control between applications running on the mobile device 102. Also shown in FIG. 4 are a web browser application 408, a media player application 410, and JAVA applets 412. The web browser application 408 configures the mobile device 102 to operate as a web browser, allowing a user to enter information into forms and select links to retrieve and view web pages. The media player application 410 configures the mobile device 102 to retrieve and play audio or audiovisual media. The JAVA applets 412 configure the mobile device 102 to provide games, utilities, and other functionality. The client application 414 may provide the same or similar functionality as the client application 162 provided by the system 100.

Figure 5:
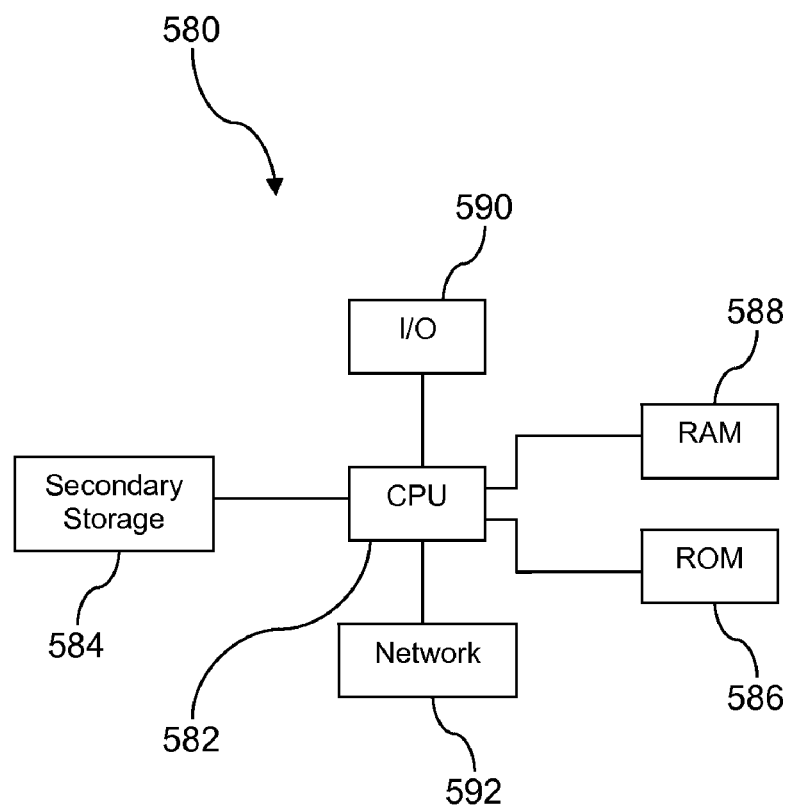
FIG. 5 illustrates an exemplary computer system suitable for implementing some aspects of the several embodiments of the disclosure.

FIG. 5 illustrates a computer system 580 suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor 582 may be implemented as one or more CPU chips.

It is understood that by programming and/or loading executable instructions onto the computer system 580, at least one of the CPU 582, the RAM 588, and the ROM 586 are changed, transforming the computer system 580 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage 584. The RAM 588 is used to store volatile data and perhaps to store instructions. Access to both ROM 586 and RAM 588 is typically faster than to secondary storage 584. The secondary storage 584, the RAM 588, and/or the ROM 586 may be referred to in some contexts as non-transitory storage or non-transitory computer readable media.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 592 may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592. While only one processor 582 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 584, for example, hard disks, floppy disks, optical disks, and/or others, the ROM 586 and/or the RAM 588 may be referred to in some contexts as non-transitory instructions and/or non-transitory information.

In an embodiment, the computer system 580 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 580 to provide the functionality of a number of servers that is not directly bound to the number of computers in the computer system 580. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 580, at least portions of the contents of the computer program product to the secondary storage 584, to the ROM 586, to the RAM 588, and/or to other non-volatile memory and volatile memory of the computer system 580. The processor 582 may process the executable instructions and/or data in part by directly accessing the computer program product, for example by reading from a CD-ROM disk inserted into a disk drive peripheral of the computer system 580. The computer program product may comprise instructions that promote the loading and/or copying of data, data structures, files, and/or executable instructions to the secondary storage 584, to the ROM 586, to the RAM 588, and/or to other non-volatile memory and volatile memory of the computer system 580.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device, comprising:
    a processor;
    a radio transceiver;
    a memory; and
    an application stored in the memory that, when executed by the processor
        receives a keyword via the radio transceiver from a server, wherein the keyword is selected based on a stored profile for a user of the mobile communication device,
        presents the keyword received from the server to the user of the mobile communication device,
        after presenting the keyword, monitors a voice call in which the mobile communication device is engaged, and
        transmits a message confirming occurrence of the keyword in the voice call via the radio transceiver, wherein after transmitting the message confirming occurrence of the keyword, the application receives a second message, the second message containing one of an item of economic value and containing a reference to an item of economic value, wherein the economic value is based in part on a number of times the keyword is used by the user in the voice call.

2. The mobile communication device of claim 1, wherein the application further transmits a message requesting the keyword from the server.

3. The mobile communication device of claim 1, wherein the application presents the keyword on a display of the mobile communication device.

4. The mobile communication device of claim 1, wherein the application presents the keyword in a voice format.

5. The mobile communication device of claim 1, wherein the keyword is associated with one of a consumer product and a consumer service.

6. The mobile communication device of claim 1, wherein the keyword is further selected based on a time and day of the voice call.

7. The mobile communication device of claim 1, wherein the keyword is further selected based on information about at least one other party involved in the voice call.

8. The mobile communication device of claim 7, wherein the economic value of the reward is increased if the at least one other party involved in the voice call uses the keyword.

9. The mobile communication device of claim 1, wherein the application further enforces vendor rules related to how the economic value is determined to prevent subscribers from abusing the vendor's sponsored keyword program.

\* \* \* \* \*